March 2, 1948. A. MILWAIN 2,437,112
CYCLE OR LIKE LOCKING MECHANISM
Filed Nov. 29, 1946
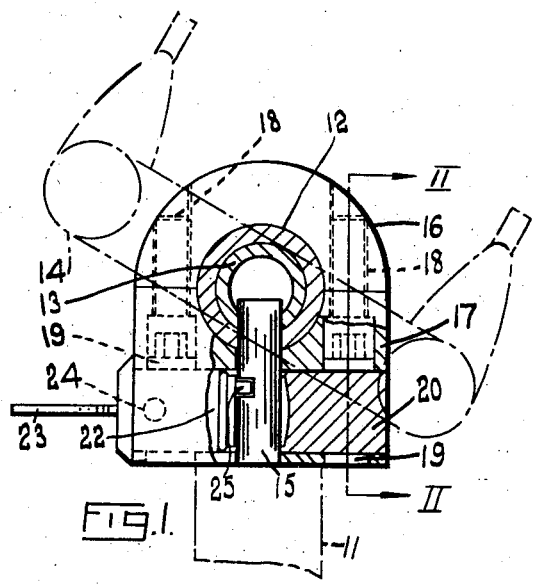
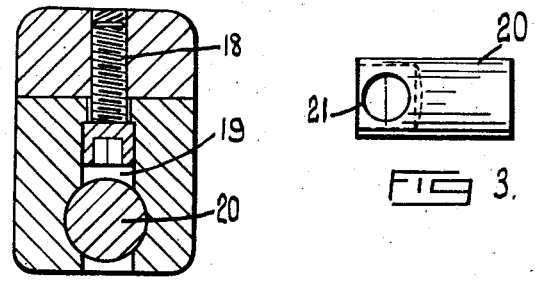
INVENTOR.
Alfred Milwain
BY
Mawhinney & Mawhinney
Attorneys Patented Mar. 2, 1948

2,437,112

UNITED STATES PATENT OFFICE 2,437,112

CYCLE OR LIKE LOCKING MECHANISM

Alfred Milwain, Coventry, England, assignor of two-thirds to Herbert Harold George Hitchcox and Annie Hitchcox, both of Coventry, England Application November 29, 1946, Serial No. 713,147
In Great Britain June 16, 1943

Section 1, Public Law 690, August 8, 1946
Patent expires June 16, 1963

5 Claims. (Cl. 70—185)

1

This invention relates to a locking mechanism for a cycle, tricycle, tandem or the like.

My main object is to provide a simple form of mechanism which can be applied to existing bicycles with very little difficulty.

According to the invention, the mechanism comprises a casing having parts adapted to be clamped together so as to embrace the steering head of the cycle, a key-actuated lock secured in the casing and having a movable element to coact with a catch to hold the catch either in an operative position in which it is adapted to extend through a hole in the steering head into a hole in the stem of a front fork in the steering head or in an inoperative position in which it will be free from engagement with the hole in the front fork, and members for clamping the parts of the casing together housed in the casing and normally covered by the lock and by a coacting plug to thereby prevent removal of the casing without disturbing the lock and the plug, the latter being located in the casing by inter-engagement with the catch in all positions of the latter. Conveniently the catch is a bolt, the movable element of the lock carrying an eccentric which works in a transverse slot in the bolt to move it.

In the accompanying drawings:

Figure 1 is a cross-section through the steering head of a bicycle having a locking mechanism, according to the invention, shown partly in section;

Figure 2 is a section taken on the line II—II of Figure 1; and

Figure 3 is an elevation of a locating plug hereinafter referred to.

In the drawings the chain line 11 represents the ordinary forward inclined frame member of a bicycle and 12 the tubular frame member of the steering head having inside it the rotatable stem 13 of the front fork, indicated by the chain lines 14. In the present instance the fork stem 13 has in it a hole which in one position of the front fork, i. e., when the latter is set to steer in a circle, as shown in Figure 1, is aligned with a hole in the tubular frame member 12, the two holes being of a size to receive a locking catch in the form of a bolt 15. The latter is slidably supported in the body or casing of a locking mechanism formed of two parts 16, 17 which can be secured to one another by socket screws 18, the heads of which lie within recesses 19. Normally, one of the heads is screened from the opening to the recess by a plug 20 mounted in a transverse bore of the casing and having a hole 21 through which the locking bolt 15 extends, the

2 other head being screened by means of the stationary barrel 22 of a barrel-type lock which is operable by means of a key 23. Thus, until the plug 20 and the barrel 22 have been removed there is no access to the socket screws 18 and the parts cannot, therefore, be dismantled. The plug 20 cannot be removed as its hole 21 is engaged by the locking bolt, and the barrel 22 is located in position by means of a counter-sunk dowel in the casing—indicated at 24. The locking bolt 15 has a transverse slot engaged with an eccentric pin 25 on the rotatable member on the key-actuated lock.

It will be observed from Figure 1 that when the key has been turned to the position shown, for which purposes the fork must first be set at the appropriate steering angle, the locking bolt 15 is driven home and the fork is thus locked at this angle and, the key having been removed, the bicycle can only be wheeled in a circle, which militates against it being stolen. When the key is reinserted and turned in the other direction, the locking bolt 15 will be withdrawn outwardly to be clear of the hole in the stem 13, thus allowing the bicycle to be steered in the ordinary manner.

In assembling the parts on a bicycle, the casing parts can first be mounted in position and the two holes then drilled in the frame member 12 and the fork stem 13 (while the latter is set at an appropriate angle) to be in line with the hole 21 in the plug 20. Thereupon the locking bolt is inserted in position and then the key-actuated lock with its eccentric projection 25 engaged with the transverse slot in the locking bolt, after which the key-actuated lock is located in position by the insertion of the dowel pin 24.

The parts aforesaid can be inexpensively manufactured and assembled, and fitted to existing bicycles and the like with very little trouble.

What I claim as my invention and desire to secure by Letters Patent of the United States is:

1. A locking means for a cycle or the like having a fixed steering head and, supported therein, the stem of a steerable front fork, the locking means comprising a casing having parts adapted to be clamped together so as to embrace the steering head, a key-actuated lock secured in the casing, the lock having a movable element to coact with a catch to hold the catch either in an operative position in which it is adapted to extend through a hole in the steering head into a hole in the stem of a front fork or in an inoperative position in which the catch will be free from engagement with the hole in the stem of the front fork, members for clamping the parts of the casing together housed in the interior of the casing, one of said members being normally covered by the lock, and a plug located in the casing by interengagement with the catch in all positions of the latter, the plug normally covering the other of said members to thereby prevent removal of the casing without disturbing the lock and the plug.

2. A locking means for a cycle or the like, according to claim 1, in which the catch is a bolt, the movable element of the lock carrying an eccentric which works in a transverse slot in the bolt to move it.

3. A locking means for a cycle or the like, according to claim 1, in which the key-actuated lock and the plug are carried in a bore in the casing transverse to a bore in which the catch is carried.

4. A locking means for a cycle or the like, according to claim 1, in which the catch is housed in, and movable through, a hole in the plug so as to retain the plug in the casing.

5. A locking means for a cycle or the like, according to claim 1, in which the clamping members are screws.

ALFRED MILWAIN.

REFERENCES CITED

The following references are of record in the file of this patent:

UNITED STATES PATENTS

| Number | Name | Date |
| --- | --- | --- |
| 1,268,137 | Mailloux | June 4, 1918 |
| 1,416,413 | Paige | May 16, 1922 |
| 2,143,502 | Taman | Jan. 10, 1939 |